United States Patent [19]
Monti et al.

[11] Patent Number: 5,942,575
[45] Date of Patent: Aug. 24, 1999

[54] PROCESS FOR MANUFACTURING RUBBER-REINFORCED VINYL-AROMATIC POLYMERS

[75] Inventors: Luca Monti; Giuseppe Romagnoli, both of Mantova, Italy

[73] Assignee: Enichem S.p.A., Milan, Italy

[21] Appl. No.: 08/937,664

[22] Filed: Sep. 24, 1997

[30] Foreign Application Priority Data

Sep. 27, 1996 [IT] Italy ................... MI96A1978

[51] Int. Cl.$^6$ .......................... C08L 51/04; C08F 279/02
[52] U.S. Cl. .................. 525/52; 525/71; 525/316
[58] Field of Search ................ 525/52, 71, 316

[56] References Cited

U.S. PATENT DOCUMENTS

| | | |
|---|---|---|
| 4,146,589 | 3/1979 | Dupre . |
| 4,493,922 | 1/1985 | Echte et al. ................ 525/71 |
| 5,240,993 | 8/1993 | Aerts et al. ................ 525/52 |

FOREIGN PATENT DOCUMENTS 0 727 449  8/1996  European Pat. Off. .

*Primary Examiner*—David Buttner
*Attorney, Agent, or Firm*—Oblon, Spivak, McClelland, Maier & Neustadt, P.C.

[57] ABSTRACT

Process for manufacturing vinyl-aromatic polymers reinforced with rubber and with bimodal morphology of the rubber phase, which process comprises:

blending a first stream of a first vinyl-aromatic prepolymer, containing a fine-particle rubber phase prepared in a reactor of PFR type, with a second stream consisting of a larger-particle prepolymer, prepared in a CFSTR (Continuous Flow Stirred Tank Reactor);

completing the polymerization until a rubber-reinforced vinyl-aromatic polymer with bimodal morphology is obtained, which is characterized by a considerable improvement in mechanical synergism associated with excellent aesthetic properties.

10 Claims, 2 Drawing Sheets

PROCESS FOR MANUFACTURING RUBBER-REINFORCED VINYL-AROMATIC POLYMERS

The present invention relates to a process for producing rubber-reinforced vinyl-aromatic polymers.

More particularly, the present invention relates to styrene polymers reinforced with rubber and in which the rubber component displays a bimodal morphology.

The physical-chemical characteristics and the mechanical properties of rubber-reinforced vinyl-aromatic polymers, in particular high-impact polystyrene (HIPS), are known to depend on a plurality of factors, among which the size of the rubber particles grafted onto the polymeric matrix and cross-linked, may be mentioned.

It is known as well that certain properties, such as impact strength and surface gloss, in particular in HIPS's, are influenced in mutually opposite ways by the average size and the distribution of diameters of rubber particle, for a certain rubber concentration. More precisely, the "large" particles increase the impact strength of the material at expense of gloss, whilst the "fine" particles reduce its toughness, but give it a high gloss.

In pertinent technical literature, methods were proposed in the past in order to obtain rubber-reinforced vinyl-aromatic polymers, for example rubber-reinforced polystyrenes, which display a good surface gloss associated with a high impact strength. For example, one from these methods provides for the addition, in the polymeric matrix, of a limited number of "large" rubber particles to a larger number of already present "fine" rubber particles. The resulting products are generally defined as "high-impact vinyl-aromatic polymers with bimodal distribution of the sizes of rubber particles".

In the case of HIPS's, this combination allows a product to be obtained which displays a synergistic increase in impact strength, combined with an excellent surface gloss.

For example, U.S. Pat. No. 4,153,645 discloses a HIPS with an improved property balance obtained by mechanically blending 50–85% by weight of a high-impact polystyrene containing fine rubber particles (with an average diameter of about 0.2–0.9 micrometers) with 15–50% by weight of a high-impact polystyrene containing larger rubber particles (average diameter of about 2–5 micrometers). According to this patent, the final product obtained by blending both HIPS displays impact strength or bending strength values which are higher than those expected by applying the law of mixtures, without observing losses of other physical properties.

In U.S. Pat. No. 5,240,993, a method is disclosed for preparing high-impact vinyl-aromatic polymers, characterized by a bimodal distribution of the rubber phase, according to a continuous bulk process in which two plug flow reactors, generally known as PFR (Plug Flow Reactors), are used, arranged in parallel. In one of said reactors a first prepolymer is prepared, which contains a fine-particle rubber phase, whereas in the other reactor a second prepolymer is prepared which contains a large-particle rubber phase.

On leaving their respective reactors, both polymeric streams are mixed, and the polymerization is brought to completeness in a third reactor, also of PFR type, referred to as the "finishing reactor".

According to this patent, the process disclosed allows the size of rubber particles, both the fine and the large ones, the grafting rate and the molecular weight of grafted and free vinyl-aromatic polymer to be effectively controlled:

In particular, according to the latter U.S. patent, the process provides for a first rubber solution in the vinyl-aromatic monomer to be continuously fed to a first reactor and it to be partially polymerized up to a conversion of 10–50%, so as to produce a first prepolymer containing rubber particles with an average diameter of 0.05–1.5 micrometers. Analogously, a second solution is continuously fed to a second reactor, is partially polymerized up to a conversion of 10–50% in order to produce a second prepolymer containing rubber particles with an average diameter of 0.7–10 micrometers. Both partially polymerized streams are continuously discharged from their respective reactors and are fed to a third reactor, for example of PFR type, in which the polymerization is brought to completeness. In the final polymer, the rubber content is constituted by 50–95% of particles with fine morphology, and 5–50% of particles with a large morphology.

Aiming at improving the performance level of the materials obtained according to the methods known from prior literature, in particular from U.S. Pat. No. 5,240,993, the present Applicant found that using in parallel a reactor of PFR type and a reactor of CFSTR (Continuous Flow Stirred Tank Reactor) type for producing, respectively, a first stream made up of a first vinyl-aromatic prepolymer containing a fine-particle rubber phase and a second stream made up of a second, larger-particle, prepolymer, leads, after mixing and polymerization completion, to a rubber-reinforced vinyl-aromatic polymer with bimodal particles morphology which is characterized by a considerable improvement in mechanical synergism associated with excellent aesthetic properties.

Therefore, the subject-matter of the present invention is a process for preparing vinyl-aromatic polymers reinforced with rubber and with bimodal morphology of the rubber phase, which comprises:

a) continuously feeding to a first reactor, of PFR type, a first solution of a rubber in a liquid media, essentially constituted by at least one vinyl-aromatic monomer;

b) continuously feeding, to a second reactor, of CFSTR type, a second solution of a rubber in a liquid media, essentially constituted by at least one vinyl-aromatic monomer;

c) continuously polymerizing said first solution in said first PFR type reactor, until a conversion of 10–50% is obtained, based on total present monomers, in order to produce a first composition based on a first prepolymer containing a rubber phase having an average diameter, by volume, $(D_v)$ of the rubber particles dispersed and grafted onto the polymeric matrix, comprised within the range from 0.04 to 1.8 micrometers;

d) continuously polymerizing said second solution in said second CFSTR type reactor, until a conversion of 10–50% is obtained, based on total present monomers, in order to produce a second composition based on a second prepolymer containing a rubber phase having an average diameter, by volume, $(D_v)$ of the rubber particles dispersed and grafted onto the polymeric matrix, comprised within the range from 0.6 to 12 micrometers, with said average diameter of the rubber particles of said second prepolymer being at least twice as large as the average diameter of the rubber particles of the first prepolymer;

e) continuously discharging said first and second compositions from said first and second reactors, in order to produce a third composition, which is obtained by continuously mixing the first and second compositions with one another;

f) further polymerizing, still continuously, said third composition, and separating the resulting polymer from unreacted monomers in order to obtain a vinyl-aromatic polymer reinforced with rubber, having a bimodal morphology of the rubber phase.

Figure 1:
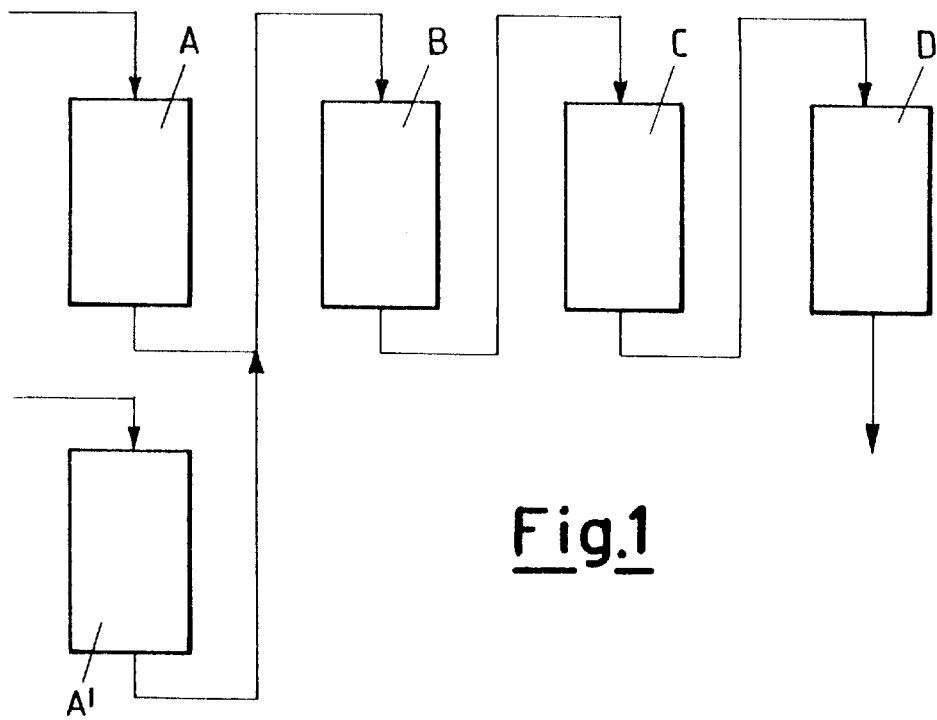
FIG. 1 depicts a prior art flow diagram utilizing two PFR's in parallel.

According to the present invention, the first solution fed to PFR reactor is essentially constituted by at least one vinyl-aromatic monomer and a rubber.

Under "vinyl-aromatic monomer", as used in the present disclosure and in the claims, those ethylenically unsaturated compounds are understood, having the general formula (I):

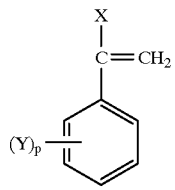

(I)

in which X represents hydrogen or an alkyl radical having from 1 to 4 carbon atoms; p is 0 or an integer comprised within the range from 1 to 5; and Y represents a halogen or an alkyl radical from 1 to 4 carbon atoms.

Examples of vinyl-aromatic monomers of formula (I) are: styrene, mono-, di-, tri-, tetra- and pentachlorostyrene and corresponding alpha-methyl-styrenes; ring-alkylated styrenes and the corresponding alpha-methyl styrenes; ortho-, meta- and para-methyl styrene; ortho- and para-methyl-alpha-methyl styrene and so forth. Styrene is the preferred vinyl-aromatic monomer.

The vinyl-aromatic monomers can be used either alone, or mixed with one another, or combined with other copolymerizable monomers, as maleic acid anhydride or acrylic or methacrylic monomers.

Under "acrylic monomers" above all, and preferably, acrylonitrile is understood. Other acrylic or methacrylic monomers are methacrylonitrile, acrylic or methacrylic acid and their alkyl esters containing from 1 to 8 carbon atoms in the alkyl radical.

The amounts of vinyl-aromatic monomers and of copolymerizable monomers used in the process according to the present invention may vary as a function of the desired physical-mechanical properties of the final product. The amount of copolymerizable monomer is comprised within the range of up to 40% by weight, generally of from 15 to 35%, based on total monomer blend.

The rubber dissolved in the first solution is selected from those which are capable of forming fine-morphology particles in the polymeric matrix. For example, a particularly suitable rubber for preparing said first solution is selected from linear diblock rubbers of S-B type in which S represents a non-elastomeric polymer block derived from a vinyl-aromatic monomer, for example styrene, having an average molecular weight ($M_w$) comprised within the range from 5,000 to 80,000, whereas B represents an elastomeric polymer block derived from a conjugated diene, for example butadiene, having an average molecular weight ($M_w$) comprised within the range from 2,000 to 250,000. In these rubbers, the amount of block S is comprised within the range from 10 to 50%, based on total S-B rubber.

Further examples of rubbers capable of forming fine particles in the polymeric matrix are linear polybutadienes having an average molecular weight ($M_w$) of $\leq 100,000$ g/mol and branched polybutadienes having viscosity, in solution, of $\leq 45$ cPs.

The second solution fed to CFSTR reactor is essentially constituted by at least one vinyl-aromatic monomer and a rubber. Whilst the vinyl-aromatic monomer is substantially identical to the vinyl-aromatic monomer of the first solution, the rubber is selected from those which are capable of forming particles with large morphology in the polymeric matrix. Examples of such rubbers are the linear polybutadiene homopolymers having a content of trans-1,4-isomer higher than 50% by mol and a viscosity (in solution at 5% in styrene) higher than 100 cPs.

The amount of rubber present in both the first and second solutions is comprised within the range from 2 to 20% by weight, preferably from 3 to 15%, based on the weight of the total solution.

Besides the above mentioned components, the solutions can contain those additives which are conventionally used in this type of polymerizations, such as solvents, flow improvers, mold-release agents, antioxidants, catalysts, lubricants, plasticizers, chain transfer agents, and so forth.

The polymerization conditions for (c) and (d) steps are typical for PFR and CFSTR reactors and are disclosed in technical literature, for example in U.S. Pat. No. 2,727,884, as regards PFR reactors—or in U.S. Pat. No. 3,903,202, as regards CFSTR reactors.

When a conversion of monomers comprised within the range from 10 to 50% is obtained, from both reactors two streams are continuously withdrawn which are blended with each other in such proportions that the rubber particles deriving from the first prepolymer will constitute 50–95% by weight of the rubber content of the final product. The so obtained blend is fed to a third reaction unit in order to complete the polymerization of the monomers. This third polymerization unit is constituted by one or more reactor(s) of PFR type.

When the desired conversion degree is obtained (65–95%), the removal under vacuum and at high temperature (200–260° C.) of possibly present solvents and unreacted monomers is carried out and the resulting polymer is extruded through a suitable dye, cooled and cut into granules having the desired size. The vapour fractions, removed under vacuum, are condensed and possibly recycled.

More particularly, the polymerization of the monomers inside the three reactors according to the process of the present invention takes place according to the following conditions.

The rubbers are dissolved in the monomers, possibly in the presence of an inert solvent in an amount which may be comprised within the range from 5 to 20% by weight, relatively to the total amount of monomer plus rubber, and both resulting solutions are then submitted to the first polymerization step using an initiator.

Each reactor is kept under a higher pressure than the pressure at which the fed components will evaporate. Usually, the pressure is comprised within the range from 0.5 to 5 bars, and the temperature is comprised within the range from 70 to 150° C. Inside the PFR reactor, the temperature is so distributed as to yield two or more heated regions at different temperatures.

The dissolution of the rubbers in the blend of monomer and possible solvent, is carried out in two separate mixers, each kept at a temperature not higher than 100° C.

Examples of inert solvents which can be used in the preparation of the vinyl-aromatic polymer of the present invention comprise the aromatic hydrocarbons which are liquid at polymerization temperature, such as, e.g., toluene, ethylbenzene, xylenes, and so forth, or their blends.

The initiators used are the conventional ones which are used in styrene polymerization as, e.g., the organic peroxy radical initiators. Examples of such initiators are: dibenzoyl peroxide, tert.-butyl peroctanoate, tert.-butyl perbenzoate, di-tert.butyl peroxide, 1,1'-di-tert.-butyl peroxy-3,3,5-trimethyl cyclohexane, 1,1'-di-tert.-butyl peroxy cyclohexane, and so forth. These initiators are added in amounts comprised within the range from 0.005 to 0,5% by weight, relatively to the monomer.

According to a preferred embodiment of the process according to the present invention, the rubber reinforced vinyl-aromatic polymer is a high-impact polystyrene (HIPS). For this product type, the $D_v$ values of rubber particles dispersed in the first prepolymer are comprised within the range from 0.1 to 1 micrometers, preferably from 0.2 to 0.7 micrometers, and in the second prepolymer the $D_v$ values are comprised within the range from 1 to 6 micrometers, preferably from 1.5 to 5 micrometers, still with the proviso that the $D_v$ values of the rubber particles of the second prepolymer are at least twice as large as $D_v$ values of the rubber particles of the first prepolymer.

The rubber-reinforced vinyl-aromatic polymers prepared by means of the process of the present invention display an excellent balance of physical-mechanical properties, as impact strength, both at room temperature or below 0° C., excellent values of elongation at break, yield stress and stress at break, tensile elastic modulus, and so forth, combined with a high gloss. Owing to these characteristics, said polymers are suitable for being used in typical valuable applications, as those of HIPS's.

In order to better understand the present invention and to practice it, in the following some illustrative examples are reported which in no way shall be understood as being limitative of the present invention.

In the following examples, four different rubbers were used, which are defined as follows.

R1

R1 is a diblock styrene-butadiene copolymer containing 40% of styrene units, available from the market as BUNA BL 6533 (Bayer) or as NIPOL NS 312 SC (Nippon Zeon). The solution viscosity of the diblock copolymer is 40 cPs, as measured on a solution at 5% in styrene monomer.

R2

R2 is a polybutadiene homopolymer sold by Bayer, under the name of BUNA Hx 565. It is characterized by a branched structure, a viscosity (as measured in a solution at 5% in styrene monomer) of 42 cPs, and a Mooney viscosity (100° C.) of 57.

R3

R3 is a polybutadiene homopolymer available on the market with the trade names BUNA Hx 528 (Bayer) or INTENE 50 A (Enichem Elastomeri). It contains approximately 54% of trans-1,4 isomer, 38% of cis-1,4 isomer, and has a Mooney viscosity (100° C.) of 53 and its solution viscosity, (as measured in a solution at 5% in styrene monomer) is 170 cPs.

R4

R4 is a polybutadiene homopolymer available on the market with the trade name BUNA Hx 530 (Bayer). It contains approximately 54% of trans-1,4 isomer, 38% of cis-1,4 isomer, and has a Mooney viscosity (100° C.) of 68 and its solution viscosity (as measured in a solution at 5% in styrene monomer) is 250 cPs.

R5

R5 is a blend of R1 and R2 in a ratio of 80:20 by weight.

R6

R6 is a blend of R3 and R4 in a ratio of 50:50 by weight.

For all disclosed tests and materials, the testing methods are disclosed herein in the following.

Fluidity

The Melt Flow Index (M.F.I.) was determined according to ASTM D 1238 standard method, at 200° C. and under a load of 5 kg.

IZOD Impact Strength (Notched "½*½" and Notched "½*⅛")

This property was measured according to ASTM D 256 standard method, and is expressed as kg*cm/cm.

Tensile Properties (Yield Stress, Tensile Strength, Elongation at Break, Tensile Elastic Modulus)

These properties were measured according to ASTM D 638 standard method and are expressed as MPa, except for elongation at break, which is expressed as percent.

In order to prepare the specimens for IZOD and tensile tests, each material was injected moulded, after determining, by way of experiments, the maximal injection pressure above which the "flash moulding" phenomenon appears. The temperature of the molten polymer is comprised within the range from 180 to 190° C.

Optical Properties

Gloss was measured according to ASTM D 523 standard method at two reading angles (20° and 60°), by using a glossmeter of Dr. Lange type, with two standard references supplied together with the equipment. In order to obtain the test specimens (injection moulded three-step slabs; size of the measurement zone: 95 mm×75 mm×3 mm), the following particularly critical conditions were used in order to evidence the true level of gloss of materials: temperature of the molten material=220° C.; mould temperature=35° C.

Percent Rubber Content

The percent rubber content in the produced materials was determined by iodometric titration, according to the method by Wijs (Berichte, 1898, Vol. 31, page 750), or by calculating the ratio of the percent amount of fed elastomer to the end conversion rate.

Average Morphology Size Values

This characteristic was determined for the same materials by analysis by electronic microscopy in trasmission mode (F. Lenz, A. Wiss, Mikroscopie 63, 1956, page 56) and is expressed as micrometers. For the calculation of the statistic parameters ($D_v$; $D_L$; $D_N$) of the diameter distributions, the stereologic approach was applied (C. Maestrini et al., Journal of Material Science, Vol. 27, 1992, page 5994).

The equipment pieces and the process illustrated in FIG. 1 were used in order to prepare high-impact polystyrenes with bimodal morphology, in which both morphology modes are produced by prepolymerization in PFR reactors (comparison examples). In particular, in FIG. 1, (A) and (A') represent both prepolymerization reactors of PFR type in which a first prepolymer containing a rubber phase constituted by particles having a "small" average diameter (reactor A) and a second prepolymer containing a rubber phase constituted by particles having a "larger" average diameter (reactor A') are prepared, respectively. The streams leaving the reactors (A) and (A') are mixed and then are fed to PFR reactors (B), (C) and (D) in order to complete the polymerization.

Figure 2:
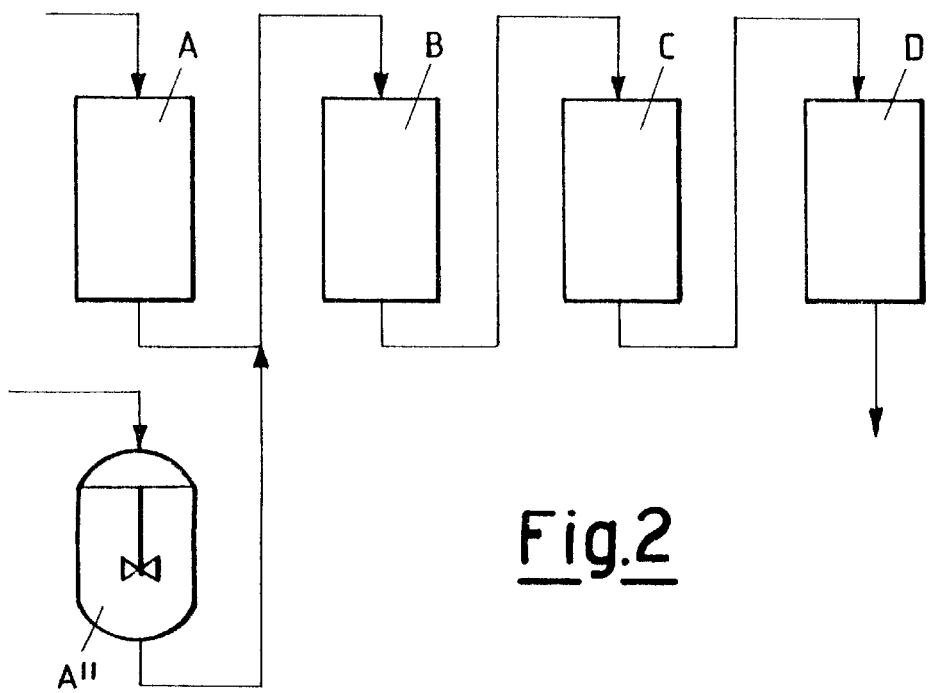
FIG. 2 depicts the claimed process utilizing a CFSTR and a PFR in parallel.

The equipment pieces and the process illustrated in FIG. 2 were used in order to prepare high-impact polystyrenes with bimodal morphology in which the fine-particle morphologic mode is produced by polymerization in PFR reactor (A), and the large-particle mode is produced in a reactor of CFSTR type (A") (examples according to the present invention). Also in the case displayed in FIG. 2, the streams leaving the reactors (A) and (A") are mixed and then are fed to PFR reactors (B), (C) and (D) in order to complete the polymerization.

Any process and formulation conditions not represented in the examples, or the size of the various equipment pieces can be easily obtained on considering the information reported in the literature and relating to obtaining high-impact vinyl-aromatic polymers, for example HIPS, according to a continuous bulk process.

Figure 3:
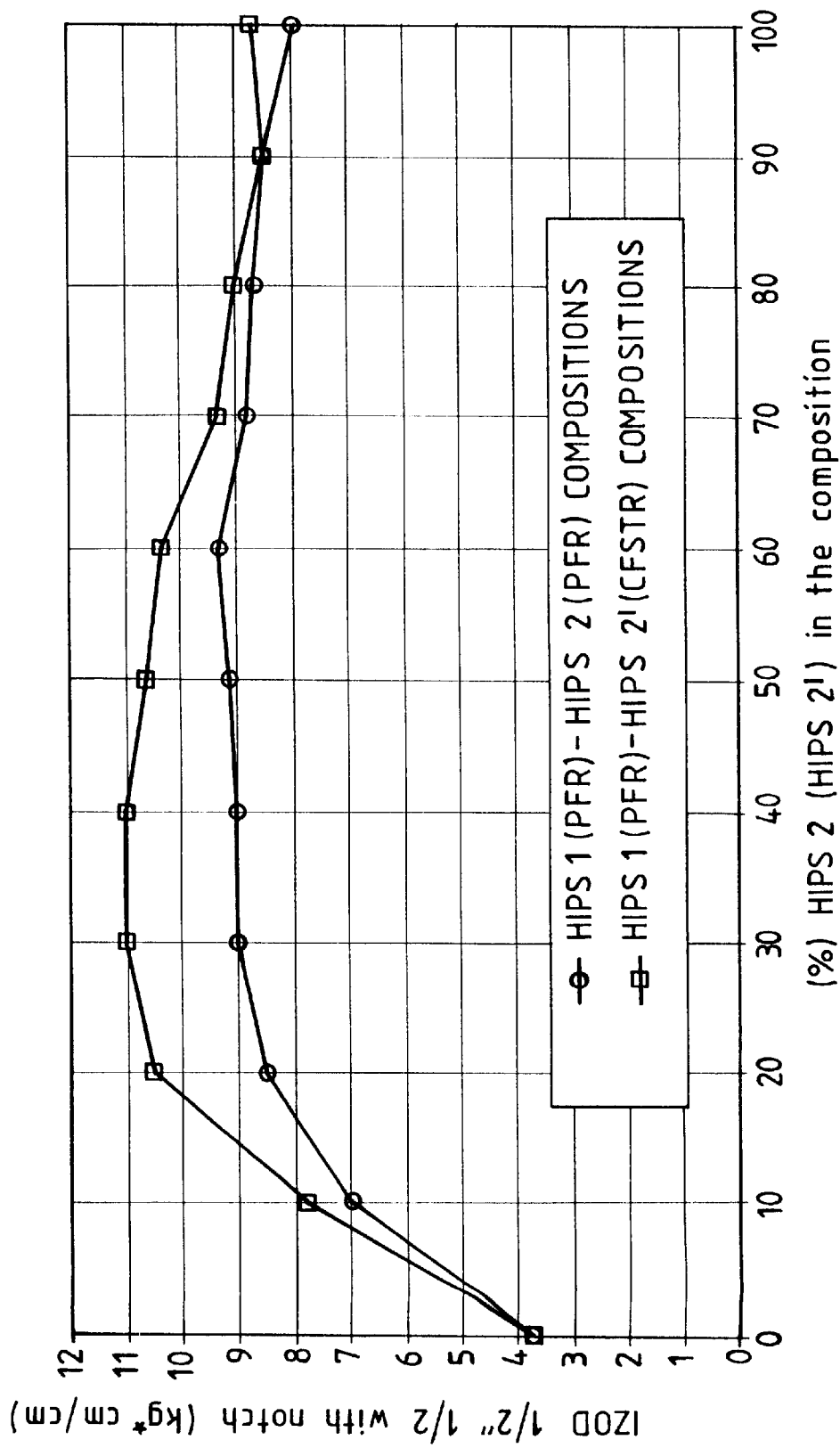
FIG. 3 reports the impact strength of compositions prepared according to the processes of FIGS. 1 and 2.

In FIG. 3, IZOD impact strength ½*½ with notch is reported as a function of two bimodal high-impact polystyrenes prepared according to the process of FIG. 1 (—●—: comparison line) and of FIG. 2 (—■—: line according to the present invention), respectively.

In the following tables, the following short codes are used for the sake of brevity:

Solvent=blend of aromatic hydrocarbons;
IRGANOX 245=antioxidant;
NDM=n-dodecyl mercaptan;
TDM=tert.-dodecyl mercaptan;
DTBP=di-tert.-butyl peroxide;
DTBPTCE=1,1-di-tert.-butyl peroxy-3,3,5-trimethyl-cyclohexane.

EXAMPLE 1

A monomodal HIPS ("HIPS 1") with a "capsule" structure and rubber particles of 0.22 $\mu$m ($D_v$) was prepared by polymerizing a solution containing 8.75 parts of R5 rubber, 1.9 parts of heavy vaseline oil; 0.05 parts of antioxidant; 9 parts of solvent, 0.009 parts of DTBP, 0.025 parts of NDM chain transfer agent and 80.26 parts of styrene monomer. Said solution was fed to reactor (A) (FIG. 1) at a flow rate of 50 kg/h. The conversions at reactors A and D outlets were 40% and 75%, respectively.

The mechanical and aesthetic properties of HIPS 1 are reported in Table 1.

EXAMPLE 2

A monomodal HIPS ("HIPS 2") with a "salami" structure and rubber particles of 2.4 $\mu$m ($D_v$) was prepared by polymerizing a solution containing 5.25 parts of R3 rubber, 1.5 parts of heavy vaseline oil; 0.025 parts of antioxidant; 7 parts of solvent, 0.019 parts of DTBPTCE, 0.0075 parts of NDM chain transfer agent and 86.2 parts of styrene monomer. Said solution was fed to reactor (A') (FIG. 1) at a flow rate of 50 kg/h. The conversions at reactors A' and D outlets were 40% and 75%, respectively.

The mechanical and aesthetic properties of HIPS 2 are reported in Table 1.

EXAMPLE 3

A monomodal HIPS ("HIPS 2'") with a "salami" structure and rubber particles of 2.9 $\mu$m ($D_v$) was prepared by polymerizing a solution containing 5.25 parts of R6 rubber, 1.5 parts of heavy vaseline oil; 0.032 parts of antioxidant; 5 parts of solvent, 0.015 parts of DTBPTCE, 0.007 parts of NDM chain transfer agent and 88.51 parts of styrene monomer. Said solution was fed to reactor (A") (FIG. 2) at a flow rate of 50 kg/h. The conversions at reactors A" and D outlets were 40% and 75%, respectively.

The mechanical and aesthetic properties of HIPS 2' are reported in Table 1.

EXAMPLE 4 (COMPARISON EXAMPLE)

A bimodal HIPS ("BPSD 4") with "capsule" particles of 0.22 $\mu$m and "salami" particles of 2.4 $\mu$m was prepared by prepolymerizing in PFR reactor (A) of FIG. 1, with a flow rate of 35 kg/h, a solution containing 8.75 parts of R5 rubber, 1.9 parts of heavy vaseline oil; 0.05 parts of antioxidant; 9 parts of solvent, 0.015 parts of DTBP, 0.03 parts of NDM chain transfer agent, 0.01 parts of TDM and 80.26 parts of styrene monomer, up to a conversion of approximately 40%. In the reactor PFR (A'), a solution, fed at a flow rate of 15 kg/h, is prepolymerized, which contains 5.25 parts of R3 rubber, 1.5 parts of heavy vaseline oil; 0.025 parts of antioxidant; 8.5 parts of solvent, 0.035 parts of DTBPTCE, 0.025 parts of NDM, 0.03 parts of TDM and 84.63 parts of styrene monomer, up to a conversion of approximately 40%.

Both prepolymeric compositions, continuously withdrawn from the respective reactors, were mixed and fed to a series of three PFR reactors in which the polymerization was carried out until a conversion of about 75% was reached. At the end, both solvent and unreacted monomer were recovered by means of a devolatilization step.

The mechanical and aesthetic properties of so obtained bimodal HIPS are reported in Table 2. The same table also reports the mechanical and aesthetic properties of other bimodal HIPS obtained by means of the above disclosed process, but with different blending ratios of both prepolymeric compositions.

EXAMPLE 5

A bimodal HIPS ("BPSD 14") with "capsule" particles of 0.22 $\mu$m and "salami" particles of 2.9 $\mu$m was prepared by prepolymerizing in the PFR reactor (A) of FIG. 2, with a flow rate of 35 kg/h, a solution containing 8.75 parts of R5 rubber, 1.9 parts of heavy vaseline oil; 0.05 parts of antioxidant; 9 parts of solvent, 0.015 parts of DTBP, 0.03 parts of NDM, 0.01 parts of TDM and 80.26 parts of styrene monomer, up to a conversion of approximately 40%. In the CFSTR reactor (A"), a solution, fed at a flow rate of 15 kg/h, is prepolymerized, which contains 5.25 parts of R6 rubber, 1.5 parts of heavy vaseline oil; 0.025 parts of antioxidant; 6 parts of solvent, 0.03 parts of DTBPTCE, 0.02 parts of NDM, 0.015 parts of TDM and 87.15 parts of styrene monomer, up to a conversion of approximately 40%.

Both prepolymeric compositions, continuously withdrawn from the respective reactors, were mixed and fed to a series of three PFR reactors in which the polymerization was carried out until a conversion of about 75% was reached. At the end, both solvent and unreacted monomer were recovered by means of a devolatilization step.

The mechanical and aesthetic properties of so obtained bimodal HIPS are reported in Table 3. The same table also reports the mechanical and aesthetic properties of other bimodal HIPS's obtained by means of the above disclosed process, but with different blending ratios of both prepolymeric compositions.

The characterization data of these materials (see also FIG. 3) show that replacing PFR reactor by the CFSTR reactor for prepolymerizing HIPS with "salami" particles, causes an increase in impact strength of the resulting products according to the present invention, as compared to the traditional products, with the surface characteristics remaining essentially unchanged.

In Tables 2* and 3* the formulations and process conditions are reported which are used in order to obtain some bimodal HIPS's of comparison examples (Table 2*) and of the examples according to the present invention (Table 3*) respectively.

TABLE 1

MONOMODAL HIPS COMPOSITIONS

| EXPERIMENT No. | HIPS 1 (PFR) | HIPS 2 (PFR) | HIPS 2' (CFSTR) |
|---|---|---|---|
| FEED COMPOSITION | | | |
| Rubber: type | R5 | R3 | R6 |
| percent content (%) | 8.75 | 5.25 | 5.25 |
| Vaseline oil (%) | 1.9 | 1.5 | 1.5 |
| Antioxidant (%) | 0.05 | 0.026 | 0.032 |
| Initiator: type | DTBP | DTBPTCE | DTBPTCE |
| percent content (%) | 0.0090 | 0.0190 | 0.015 |
| Chain transfer agent: type | NDM | NDM | NDM |
| percent content (%) | 0.025 | 0.0075 | 0.0070 |
| Solvent (%) | 9 | 7 | 5 |
| Styrene (%) | 80.26 | 86.20 | 88.51 |
| REACTION CONDITIONS | | | |
| Feed flow rate (kg/h) | 50 | 50 | 50 |
| Polymer temperature | | | |
| Reactor A (inlet) (° C.) | 118 | — | — |
| Solids A (outlet) (%) | 40 | — | — |
| Reactor A' (inlet) (° C.) | — | 115 | — |
| Solids A' (outlet) (%) | — | 40 | — |
| Reactor A" (inlet) (° C.) | — | — | 127 |
| Solids A" (outlet) | — | — | 40 |
| Reactor D (outlet) (° C.) | 156 | 156 | 160 |
| Solids D (outlet) | 75 | 75 | 75 |
| PRODUCT PROPERTIES | | | |
| POLYBUTADIENE (%) | 8.0 | 7.0 | 7.0 |
| $D_V$ (μm) [$D_{(4.3)}$] | 0.22 | 2.40 | 2.90 |
| $D_L$ (μm) [$D_{(2.1)}$] | 0.20 | 1.00 | 1.74 |
| $D_N$ (μm) [$D_{(1.0)}$] | 0.19 | 0.56 | 1.27 |
| $D_L/D_N$ | 1.07 | 1.80 | 1.38 |
| MFI (200° C.-5 kg) (g/10') | 5.7 | 4.2 | 4.5 |
| Notched IZOD ½*½ (kg*cm/cm) | 3.7 | 7.9 | 8.7 |
| Notched IZOD ½*⅛ (kg*cm/cm) | 4.2 | 9.6 | 11.1 |
| GLOSS (20°) (%) | 81 | 8 | 4 |
| GLOSS (60°) (%) | 98 | 38 | 30 |
| ASTM TENSILE TESTS | | | |
| $\sigma_Y$ (MPa) | 28 | 18.0 | 20.0 |
| $\sigma_B$ (MPa) | 24 | 23.0 | 22.8 |
| Elongation (%) | 41 | 62.0 | 55.0 |
| Elastic modulus (MPa) | 2070 | 1700 | 1970 |

TABLE 2

BIMODAL HIPS COMPOSITIONS - COMPARISON EXAMPLES

| EXPERIMENT No. | Measuring units | BPSD 1 HIPS 1 | BPSD 2 | BPSD 3 | BPSD 4 | BPSD 5 | BPSD 6 | BPSD 7 | BPSD 8 | BPSD 9 | BPSD 10 | BPSD 11 HIPS 2 |
|---|---|---|---|---|---|---|---|---|---|---|---|---|
| HIPS1/HIPS2 Ratio | (%)/(%) | 100/0 | 90/10 | 80/20 | 70/30 | 60/40 | 50/50 | 40/60 | 30/70 | 20/80 | 10/90 | 0/100 |
| MFI (200° C.-5 kg) | (g/10') | 5.7 | 5.5 | 5.5 | 5.6 | 5.7 | 5.4 | 4.8 | 5.0 | 4.9 | 4.7 | 4.2 |
| Notched IZOD ½*½ | (kg*cm/cm) | 3.7 | 7.0 | 8.5 | 9.0 | 9.0 | 9.1 | 9.3 | 8.8 | 8.7 | 8.5 | 7.9 |
| Notched IZOD ½*⅛ | (kg*cm/cm) | 4.2 | 10.6 | 12.7 | 12.3 | 11.0 | 12.5 | 12.0 | 12.1 | 10.7 | 11.9 | 9.6 |
| GLOSS (20°) | (%) | 81 | 51 | 33 | 25 | 18 | 14 | 14 | 12 | 9 | 9 | 8 |
| GLOSS (60°) | (%) | 98 | 87 | 77 | 70 | 62 | 53 | 53 | 50 | 44 | 43 | 38 |
| TENSILE TESTS | | | | | | | | | | | | |
| $\sigma_Y$ (MPa) | (MPa) | 28.0 | 24.7 | 23.6 | 22.6 | 22.0 | 20.4 | 20.3 | 19.6 | 18.9 | 18.7 | 18.0 |
| $\sigma_B$ (MPa) | (MPa) | 24.0 | 23.4 | 22.9 | 22.7 | 23.3 | 23.1 | 23.2 | 23.3 | 23.2 | 23.4 | 23.0 |
| ELONGATION | (%) | 41 | 45 | 48 | 46 | 55 | 56 | 50.7 | 55 | 58 | 64 | 62 |
| MODULUS | (MPa) | 2070 | 1920 | 1980 | 1900 | 1920 | 1890 | 1860 | 1870 | 1790 | 1750 | 1700 |

TABLE 3

BIMODAL HIPS COMPOSITIONS - PATENT EXAMPLES

| EXPERIMENT No. | Measuring units | BPSD 1 HIPS 1 | BPSD 12 | BPSD 13 | BPSD 14 | BPSD 15 | BPSD 16 | BPSD 17 | BPSD 18 | BPSD 19 | BPSD 20 | BPSD 12 HIPS 2' |
|---|---|---|---|---|---|---|---|---|---|---|---|---|
| HIPS1/HIPS2 Ratio | (%)/(%) | 100/0 | 90/10 | 80/20 | 70/30 | 60/40 | 50/50 | 40/60 | 30/70 | 20/80 | 10/90 | 0/100 |
| MFI (200° C.-5 kg) | (g/10') | 5.7 | 5.9 | 5.6 | 5.5 | 5.8 | 5.6 | 5.2 | 5.1 | 5.1 | 4.9 | 4.5 |
| Notohed IZOD ½*½ | (kg*cm/cm) | 3.7 | 7.8 | 10.5 | 11.0 | 11.0 | 10.6 | 10.3 | 9.3 | 9.0 | 8.5 | 8.7 |
| Notched IZOD ½*⅛ | (kg*cm/cm) | 4.2 | 13.7 | 15.3 | 16.4 | 16.4 | 15.1 | 13.1 | 13.2 | 12.2 | 11.9 | 11.1 |
| GLOSS (20°) | (%) | 81 | 43 | 26 | 20 | 17 | 13 | 11 | 9 | 8 | 7 | 4 |
| GLOSS (60°) | (%) | 98 | 83 | 70 | 62 | 57 | 51 | 46 | 41 | 39 | 37 | 30 |
| TENSILE TESTS | | | | | | | | | | | | |
| $\sigma_Y$ (MPa) | (MPa) | 28.0 | 24.3 | 23.0 | 23.8 | 22.8 | 22.6 | 21.8 | 21.2 | 20.7 | 19.8 | 20.0 |
| $\sigma_B$ (MPa) | (MPa) | 24.0 | 22.9 | 22.8 | 22.2 | 22.9 | 22.5 | 23.1 | 23.2 | 23.5 | 23.5 | 22.8 |
| ELONGATION | (%) | 41 | 41 | 46 | 44 | 53 | 46 | 56 | 58 | 62 | 57 | 55 |
| MODULUS | (MPa) | 2070 | 2080 | 2040 | 2050 | 2120 | 2090 | 2050 | 2040 | 2020 | 1970 | 1970 |

TABLE 2*

BIMODAL HIPS COMPOSITIONS - COMPARISON EXAMPLES

| EXPERIMENT No. | BPSD 2 | BPSD 3 | BPSD 4 | BPSD 5 | BPSD 7 | BPSD 9 |
|---|---|---|---|---|---|---|
| FEED COMPOSITION REACTOR A | | | | | | |
| Rubber: type | R5 | R5 | R5 | R5 | R5 | R5 |
| percent content (%) | 8.75 | 8.75 | 8.75 | 8.75 | 8.75 | 8.75 |
| Vaseline oil (%) | 1.9 | 1.9 | 1.9 | 1.9 | 1.9 | 1.9 |
| Antioxidant (%) | 0.05 | 0.05 | 0.05 | 0.05 | 0.05 | 0.05 |
| Initiator: type | DTBP | DTBP | DTBP | DTBP | DTBP | DTBP |
| percent content (%) | 0.009 | 0.012 | 0.015 | 0.018 | 0.021 | 0.030 |
| Chain transfer agent: | | | | | | |
| type | NDM | NDM | NDM | NDM | NDM | NDM |
| percent content (%) | 0.025 | 0.030 | 0.030 | 0.035 | 0.040 | 0.050 |
| Chain transfer agent: | | | | | | |
| type | TDM | TDM | TDM | TDM | TDM | TDM |
| percent content (%) | — | — | 0.01 | 0.02 | 0.025 | 0.030 |
| Solvent (%) | 9 | 9 | 9 | 9 | 9 | 9 |
| Styrene (%) | 80.27 | 80.26 | 80.24 | 80.23 | 80.21 | 80.20 |
| FEED COMPOSITION REACTOR A' | | | | | | |
| Rubber: type | R3 | R3 | R3 | R3 | R3 | R3 |
| percent content (%) | 5.25 | 5.25 | 5.25 | 5.25 | 5.25 | 5.25 |
| Vaseline oil (%) | 1.5 | 1.5 | 1.5 | 1.5 | 1.5 | 1.5 |
| Antioxidant (%) | 0.026 | 0.026 | 0.026 | 0.026 | 0.026 | 0.026 |
| Initiator: type | DTBPTCE | DTBPTCE | DTBPTCE | DTBPTCE | DTBPTCE | DTBPTCE |
| percent content (%) | 0.040 | 0.040 | 0.035 | 0.030 | 0.025 | 0.020 |
| Chain transfer agent: | | | | | | |
| type | NDM | NDM | NDM | NDM | NDM | NDM |
| percent content (%) | 0.035 | 0.030 | 0.025 | 0.020 | 0.015 | 0.010 |
| Chain transfer agent: | | | | | | |
| type | TDM | TDM | TDM | TDM | TDM | TDM |
| percent content (%) | 0.035 | 0.030 | 0.030 | 0.020 | 0.010 | — |
| Solvent (%) | 9 | 9 | 8.5 | 8.0 | 7.5 | 7.0 |
| Styrene (%) | 84.11 | 84.12 | 84.63 | 85.15 | 85.7 | 86.2 |
| REACTION CONDITIONS | | | | | | |
| REACTOR A | | | | | | |
| Feed flow rate (kg/h) | 45 | 40 | 35 | 30 | 20 | 10 |
| Polymer temperature | | | | | | |
| Reactor A (inlet) (° C.) | 120 | 118 | 115 | 112 | 110 | 110 |
| Reactor A (outlet) (° C.) | 145 | 143 | 140 | 135 | 130 | 125 |
| Solids A (outlet) (%) | 40 | 41 | 42 | 41 | 43 | 41 |

TABLE 2*-continued

BIMODAL HIPS COMPOSITIONS - COMPARISON EXAMPLES

| EXPERIMENT No. | BPSD 2 | BPSD 3 | BPSD 4 | BPSD 5 | BPSD 7 | BPSD 9 |
|---|---|---|---|---|---|---|
| REACTOR A' | | | | | | |
| Feed flow rate (kg/h) | 5 | 10 | 15 | 20 | 30 | 40 |
| Polymer temperature | | | | | | |
| Reactor A' (inlet) (° C.) | 100 | 102 | 105 | 108 | 110 | 115 |
| Reactor A' (outlet) (° C.) | 125 | 127 | 130 | 132 | 135 | 140 |
| Solids A' (outlet) (%) | 42 | 43 | 41 | 44 | 43 | 40 |
| REACTORS B/D | | | | | | |
| Reactor B (inlet) (° C.) | 150 | 150 | 150 | 150 | 150 | 150 |
| Reactor D (outlet) (° C.) | 160 | 160 | 160 | 160 | 160 | 160 |
| Solids D (outlet) (%) | 75 | 74 | 74 | 76 | 75 | 74 |

TABLE 3*

BIMODAL HIPS COMPOSITIONS - PATENT EXAMPLES

| EXPERIMENT No. | BPSD 12 | BPSD 13 | BPSD 14 | BPSD 15 | BPSD 17 | BPSD 19 |
|---|---|---|---|---|---|---|
| FEED COMPOSITION REACTOR A | | | | | | |
| Rubber: type | R5 | R5 | R5 | R5 | RS | RS |
| percent content (%) | 8.75 | 8.75 | 8.75 | 8.75 | 8.75 | 8.75 |
| Vaseline oil (%) | 1.9 | 1.9 | 1.9 | 1.9 | 1.9 | 1.9 |
| Antioxidant (%) | 0.05 | 0.05 | 0.05 | 0.05 | 0.05 | 0.05 |
| Initiator: type | DTBP | DTBP | DTBP | DTBP | DTBP | DTBP |
| percent content (%) | 0.009 | 0.012 | 0.015 | 0.018 | 0.021 | 0.030 |
| Chain transfer agent: | | | | | | |
| type | NDM | NDM | NDM | NDM | NDM | NDM |
| percent content (%) | 0.025 | 0.030 | 0.030 | 0.035 | 0.040 | 0.050 |
| Chain transfer agent: | | | | | | |
| type | TDM | TDM | TDM | TDM | TDM | TDM |
| percent content (%) | — | — | 0.01 | 0.02 | 0.025 | 0.030 |
| Solvent (%) | 9 | 9 | 9 | 9 | 9 | 9 |
| Styrene (%) | 80.27 | 80.26 | 80.24 | 80.23 | 8021 | 80.20 |
| FEED COMPOSITION REACTOR A" | | | | | | |
| Rubber: type | R6 | R6 | R6 | R6 | R6 | R6 |
| percent content (%) | 5.25 | 5.25 | 5.25 | 5.25 | 525 | 5.25 |
| Vaseline oil (%) | 1.5 | 1.5 | 1.5 | 1.5 | 1.5 | 1.5 |
| Antioxidant (%) | 0.032 | 0.032 | 0.032 | 0.032 | 0.032 | 0.032 |
| Initiator: type | DTBPTCE | DTBPTCE | DTBPTCE | DTBPTCE | DTBPTCE | DTBPTCE |
| percent content (%) | 0.035 | 0.035 | 0.030 | 0.025 | 0.020 | 0.018 |
| Chain transfer agent: | | | | | | |
| type | NDM | NDM | NDM | NDM | NDM | NDM |
| percent content (%) | 0.030 | 0.030 | 0.020 | 0.015 | 0.010 | 0.0075 |
| Chain transfer agent: | | | | | | |
| type | TDM | TDM | TDM | TDM | TDM | TDM |
| percent content (%) | 0.020 | 0.020 | 0.015 | 0.010 | 0.005 | — |
| Solvent (%) | 7 | 6 | 6 | 6 | 6 | 5 |
| Styrene (%) | 86.10 | 87.10 | 87.15 | 87.17 | 87.18 | 88.19 |
| REACTION CONDITIONS | | | | | | |
| REACTOR A | | | | | | |
| Feed flow rate (kg/h) | 45 | 40 | 35 | 30 | 20 | 10 |
| Polymer temperature | | | | | | |
| Reactor A (inlet) (° C.) | 120 | 118 | 115 | 112 | 110 | 110 |
| Reactor A (outlet) (° C.) | 145 | 143 | 140 | 135 | 130 | 125 |
| Solids A (outlet) (%) | 40 | 41 | 43 | 44 | 42 | 42 |

TABLE 3*-continued

BIMODAL HIPS COMPOSITIONS - PATENT EXAMPLES

| EXPERIMENT No. | BPSD 12 | BPSD 13 | BPSD 14 | BPSD 15 | BPSD 17 | BPSD 19 |
|---|---|---|---|---|---|---|
| REACTOR A" | | | | | | |
| Feed flow rate (kg/h) | 5 | 10 | 15 | 20 | 30 | 40 |
| Polymer temperature | | | | | | |
| Reactor A' (outlet) (° C.) | 112 | 114 | 116 | 115 | 122 | 125 |
| Solids A' (outlet) (%) | 41 | 44 | 42 | 43 | 42 | 41 |
| REACTORS B/D | | | | | | |
| Reactor B (inlet) (° C.) | 150 | 150 | 150 | 150 | 150 | 150 |
| Reactor D (outlet) (° C.) | 160 | 160 | 160 | 160 | 160 | 160 |
| Solids D (outlet) (%) | 75 | 73 | 75 | 76 | 74 | 76 |

We claim:

1. Process for manufacturing vinyl-aromatic polymers reinforced with rubber and with bimodal morphology of the rubber phase, which comprises:
   a) continuously feeding to a first reactor, of PFR type, a first solution of a rubber in a liquid media, essentially constituted by at least one vinyl-aromatic monomer;
   b) continuously feeding, to a second reactor, of CFSTR type, a second solution of a rubber in a liquid media, essentially constituted by at least one vinyl-aromatic monomer;
   c) continuously polymerizing said first solution in said first PFR type reactor, until a conversion of 10–50% is obtained, based on total present monomers, in order to produce a first composition based on a first prepolymer containing a rubber phase having an average diameter, by volume, ($D_v$) of the rubber particles dispersed and grafted to the polymeric matrix, comprised within the range from 0.04 to 1.8 micrometers;
   d) continuously polymerizing said second solution in said second CFSTR type reactor, until a conversion of 10–50% is obtained, based on total present monomers, in order to produce a second composition based on a second prepolymer containing a rubber phase having an average diameter, by volume, ($D_v$) of the rubber particles dispersed and grafted to the polymeric matrix, comprised within the range from 0.6 to 12 micrometers, with said average diameter of the rubber particles of said second prepolymer being at least twice as large as the average diameter of the rubber particles of the first prepolymer;
   e) continuously discharging said first and second compositions from said first and second reactors, in order to produce a third composition, which is obtained by continuously mixing said first and second compositions with one another;
   f) further polymerizing, still continuously, said third composition, and separating the resulting polymer from unreacted monomers in order to obtain a vinyl-aromatic polymer reinforced with rubber, having a bimodal morphology of the rubber phase.

2. Process according to claim 1, in which the rubber dissolved in the first solution is selected from linear diblock rubbers of S-B type in which S represents a non-elastomeric polymeric block derived from a vinyl-aromatic monomer, having an average molecular weight ($M_w$) comprised within the range from 5,000 to 80,000, and B represents an elastomeric polymeric block derived from a conjugated diene, having an average molecular weight ($M_w$) comprised within the range from 2,000 to 250,000.

3. Process according to claim 1 or 2, in which the amount of S block, in the linear diblock S-B rubbers, is comprised within the range from 10 to 50% by weight, relatively to total rubber.

4. Process according to claims 1 or 2, in which the rubber dissolved in the first solution is selected from linear polybutadienes having an average molecular weight ($M_w$) of $\leq 100,000$ g/mol and branched polybutadienes having a solution viscosity of $\leq 45$ cPs.

5. Process according to claim 1, in which the rubber dissolved in the second solution is selected from linear polybutadiene homopolymers having a molar content of trans-1,4-isomer higher than 50% and a solution viscosity (in solution at 5% in styrene monomer) higher than 100 cPs.

6. Process according to claim 1, in which the amount of rubber contained in both the first and second solutions is comprised within the range from 2 to 20% by weight, based on the weight of the total solution.

7. Process according to claim 1, in which both streams discharged from the respective prepolymerization reactors are mixed together in such proportions that the rubber particles deriving from the first prepolymer will constitute 50–95% by weight of the rubber content of the finished product.

8. Process according claim 1, in which the blend obtained from the streams leaving the respective prepolymerization reactors is fed to a third reaction unit in order to complete the polymerization of the monomers.

9. Process according to claim 8, in which the third polymerization unit is constituted by one or more reactor(s) of PFR type.

10. Process according to claim 2, wherein the vinyl-aromatic monomer is styrene and the conjugated diene is butadiene.

* * * * *